(12) United States Patent
Numminen

(10) Patent No.: US 7,372,402 B2
(45) Date of Patent: May 13, 2008

(54) METHOD FOR ENHANCING THE MEASURING ACCURACY IN AN ANTENNA ARRAY

(75) Inventor: Michael Numminen, Sävedalen (SE)

(73) Assignee: Telfonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/520,932

(22) PCT Filed: Aug. 30, 2002

(86) PCT No.: PCT/SE02/01550

§ 371 (c)(1),
(2), (4) Date: Aug. 23, 2005

(87) PCT Pub. No.: WO2004/021512

PCT Pub. Date: Mar. 11, 2004

(65) Prior Publication Data

US 2006/0012518 A1    Jan. 19, 2006

(51) Int. Cl.
*H01Q 3/00* (2006.01)
*H01Q 19/06* (2006.01)
(52) U.S. Cl. ............... 342/360; 342/368; 343/754
(58) Field of Classification Search ............ 343/754; 342/368, 73, 74, 79, 380
See application file for complete search history.

(56) References Cited

U.S. PATENT DOCUMENTS

| | | | | |
|---|---|---|---|---|
| 3,374,478 A | * | 3/1968 | Blau | ............. 342/159 |
| 3,803,625 A | | 4/1974 | Nemit | |
| 4,119,972 A | * | 10/1978 | Fletcher et al. | ............ 343/844 |
| 4,500,883 A | | 2/1985 | Gutleber | ............ 343/383 |
| 4,513,385 A | | 4/1985 | Muri | |
| 5,339,284 A | * | 8/1994 | Kaiser | ............. 367/103 |
| 5,955,994 A | * | 9/1999 | Staker et al. | ......... 343/700 MS |
| 5,973,638 A | * | 10/1999 | Robbins et al. | ............ 342/172 |
| 5,973,641 A | | 10/1999 | Smith et al. | |
| 6,178,140 B1 | | 1/2001 | Schlieter | |

(Continued)

FOREIGN PATENT DOCUMENTS

EP     0 520 489 A2   6/1992

OTHER PUBLICATIONS

International Search Report.

(Continued)

*Primary Examiner*—Thomas H. Tarcza
*Assistant Examiner*—Harry Liu
(74) *Attorney, Agent, or Firm*—Nixon & Vanderhye, P.C.

(57) ABSTRACT

The invention refers to a method and a system for enhancing the measuring accuracy in an antenna array (1), where the method comprises the steps of; a) receiving analog signals on all antenna elements (2) at a first time $t_1$; producing first values for a first radiation diagram from the values in the signals from the first time ($t_1$), and; finding the maximum point (8) for the first values, b)—reducing the signal from one interadjacent antenna element (2) at a second time ($t_2$); receiving analog signals on all antenna elements (2) except from the one switched off or reduced antenna element, and; producing second values for a second radiation diagram from the values in the signals from the second time ($t_2$); c) rejecting all values outside a first range (9) calculated from the first values, and; finding the maximum point (8) for the second values.

13 Claims, 12 Drawing Sheets

U.S. PATENT DOCUMENTS

| | | |
|---|---|---|
| 6,198,434 B1 * | 3/2001 | Martek et al. ............... 342/373 |
| 6,236,363 B1 * | 5/2001 | Robbins et al. ............. 342/360 |
| 6,351,243 B1 * | 2/2002 | Derneryd et al. ........... 343/754 |
| 6,384,782 B2 * | 5/2002 | Erikmats et al. ............ 342/379 |
| 6,487,423 B1 * | 11/2002 | Johansson ................ 455/562.1 |
| 6,795,018 B2 * | 9/2004 | Guo ........................... 342/372 |
| 2001/0006374 A1 * | 7/2001 | Erikmats et al. ............ 343/860 |
| 2002/0080073 A1 * | 6/2002 | Wastberg ............. 343/700 MS |
| 2006/0114155 A1 | 6/2006 | Numminen |

OTHER PUBLICATIONS

F. Hodjat et al., "Nonuniformly spaced linear and planar array antennas for sidelobe reduction", Antennas and Propagation, IEEE Transaction, pp. 198-204, vol. 26, No. 2, Mar. 1978.

* cited by examiner

METHOD FOR ENHANCING THE MEASURING ACCURACY IN AN ANTENNA ARRAY

This application is the US national phase of international application PCT/SE2002/001550 filed 30 Aug. 2002 which designated the U.S., the entire content of which is hereby incorporated by reference.

TECHNICAL FIELD

The invention refers to enhancing the measuring accuracy in an antenna array comprising a number of antenna elements. A method comprises the acts of;
 receiving analog signals on a number of m antenna array elements, and;
 producing a radiation diagram for the array from the values in the signals.
The technololgy also refers to an antenna array system comprising

BACKGROUND ART

In the field of antenna array systems it is well known to use antenna elements in the antenna array to shape a beam sent out from the antenna array. It is also known to let all the antenna elements in the antenna array receive signals. When the antenna array receives the signals it is possible to use one or several of the antenna elements, or even sub-array systems comprising a number of antenna elements. The antenna array can be used, for example, in a radar system or a sonar system and is intended to be used in trying to estimate the direction-of-arrival of a target.

When using the antenna array applications there is a wish to obtain high resolution and accurate estimation of the direction-of-arrival of the target. In order to gain the best performance possible it is common knowledge that there has to be a trade off between the standard deviation $\sigma$ (or variance $\sigma^2$) of the angle for detecting the target and the SNR (Signal to Noice Ratio). The higher the SNR the lower the standard deviation. The standard deviation is coupled to the probability of finding the target. The higher the standard deviation the lower the probability. The so-called "Cramér-Rao Lower Boundary (CRB)", defines the theoretically best ratio between the SNR and the standard deviation $\sigma$ for Additive White Gaussian noise (AWGN) signals. It is the desire of every antenna user to have a system that performs as close as possible to the CRB. This is due to the fact that for a given SNR the lower the standard deviation the closer to the CRB, i.e. the better the accuracy of direction-of-arrival estimation of a target.

However, the SNR is also coupled to the performance of the antenna system and the size of the targets. The performance refers to the probability of estimating the direction of arrival of a target. The accuracy depends on the width of the top of the main lobe, if the target is represented by the main lobe. The higher the SNR the more narrow the top of the main lobe. It is the tapering of the main lobe and the pointyness of the main lobe that tells where the maximum of the main lobe can be found in a radiation diagram. The more pointed the lobe the better the measuring accuracy when finding the main lobe maximum, i.e. the better measuring accuracy when estimating the direction of arrival of a target.

The lower limit for the SNR, i.e. the lowest performance possible for the antenna system, occurs where the noise in the signal drowns the signal from the target. This becomes clear if one follows the CRB when diminishing the SNR. The standard deviation increases with decreasing SNR i.e. it becomes more difficult to correctly estimate the direction of arrival of the target the lower the SNR. A strong signal compared to a low noise gives a high SNR and a low uncertainty of the estimation of the direction-of-arrival of the target, and vice versa for a low SNR.

It is a desirable feature for an antenna system to have the ability to detect and estimate the direction of arrival of the target with a reasonable probability (reasonably low standard deviation). An optimum is thus sought for the trade off between low standard deviation and low SNR.

As has been stated above, one way to obtain an antenna system with good direction finding ability is to narrow the main lobe. This can be carried out by separating the antenna elements in the antenna array. The more separated the elements are the more narrow the main lobe becomes and thus the better direction finding ability of the system.

However, the separation of the antenna elements give rise to grating lobes due to the so-called Spatial Aliasing Phenomena. The problem with grating lobes occurs when the antenna elements are separated by more than half a wavelength $\lambda$, i.e. at the Nyqvist frequency. The grating lobes are mathematical products that will appear in an antenna diagram showing a radiation diagram of the gain G ($\theta$) versus the azimuth angle $\theta$. The integral over the radiation diagram is constant independent on the size of the main lobe and the size and number of the grating lobes, i.e. the more grating lobes the lesser and narrower the main lobe.

The grating lobes will appear on each side of the main lobe and with decreased amplitude the further away from the main lobe they are found. The two grating lobes closest to the main lobe have the highest amplitude. The grating lobes are thus dependent of the angle and can be interpreted as signals from the main lobe seen from the side angle $\theta$.

The grating lobes cause problems when trying to detect the direction of arrival of a target. The target will randomly skip between the grating lobes for low SNR and will therefore create random errors regarding the detection probability of the target. Thus, the grating lobes generate a high standard deviation.

As has been described above, the more separated the antennas are, the larger the antenna becomes and the narrower the main lobe. The narrower the main lobe the better the direction detection probability, i.e. the better the estimation of direction-of-arrival. However, the more separated the antennas are, the more and the higher the grating lobes will appear in the radiation diagram of the antenna array.

To sum up the above, when the antenna elements are separated far enough to give a narrow enough main lobe to get a good estimation of direction-of-arrival, the grating lobes will cause an uncertainty because the target skips between the main lobe and the grating lobes.

It is an object of the technology to diminish random errors regarding the resolving probability of the target when trying to narrow the main lobe, in order to get better estimation of the direction-of-arrival of a target. It is thus an object of the technology to eliminate the grating lobe problem when trying to "zoom in" on a target, i.e. to achieve a better measuring accuracy.

BRIEF SUMMARY

The technology intends to meet the above objectives with a method for enhancing the measuring accuracy in an antenna array comprising a number of antenna elements.

The method comprises the acts of;

receiving analog signals with the antenna array elements, and;

producing values for a radiation diagram from the values in the signals, where the radiation diagram displays a main lobe and grating lobes when present.

The analog signals are advantageously converted to digital signals by sampling and the radiation diagram is advantageously produced from the values in the digital signals.

The radiation diagram presents the values from the received signal as the gain G ($\theta$) versus the azimuth angle $\theta$. The gain G ($\theta$) for the different angles $\theta$ are produced by using the antenna elements in pairs for calculating different values in the received signal at different angles. The antenna array is advantageously operational where the angle ($\theta$) is varied between $-\pi/2-\pi/2$. The values for the different angles are measured by using the different antenna elements in pairs. In order to be able to measure the effect for different angles for the incoming signal, the antenna array uses at least two antenna elements that are omnidirectional.

The technology is characterized in that the method comprises the acts of;

a)—receiving analog signals on all antenna elements at a first time $t_1$;

producing first values for a first radiation diagram from the values in the signals from the first time $t_1$, and;

finding the maximum point for the first values:

b)—switching off or reducing the signal from one interadjacent antenna element at a second time $t_2$;

receiving analog signals on all antenna elements except from the one switched off or reduced antenna element, and;

producing second values for a second radiation diagram from the values in the signals from the second time $t_2$;

c)—using the first values to calculate a first range referring to the second radiation diagram, outside which first range grating lobes will appear in the second radiation diagram;

rejecting all values outside the first range, thereby excluding the ambiguities in the second radiation diagram due to grating lobes, and;

finding the maximum point for the second values.

The first part of act a) is to receive analog signals on all antenna elements at a first time $t_1$. The antenna elements are advantageously placed in the antenna array with their relative distance equal to or greater than the wavelength divided by two. The wavelength refers to the frequency used in the antenna array system. The relative distance of the antenna elements fulfills the Nyqvist criteria which is which is why there will be no grating lobes appearing in the radiation diagram when using a full array.

The expression "finding or calculating the maximum point for the values", refers to finding the maximum point for the main lobe, i.e. finding or calculating the maximum value for the gain in the radiation diagram. Hence, the method intends to find or calculate at what angle $\theta_{max}$ the maximum point for the main lobe will appear in the radiation diagram.

The maximum value is sought for the values that are represented in the radiation diagram. The values are preferably saved in a memory as a vector comprising the gain G ($\theta$) versus the azimuth angle $\theta$. There are a numerous techniques known for calculating the maximum value. One way to calculate the maximum value is to search the vector for the maximum value for the gain and to find out at what angle the maximum value is present. Another way to find the maximum value is to make a graphical calculation, for example trying to find the solution to the equation where the derivative is zero.

Below the technology will be described as finding values in the radiation diagrams. However, the technology may instead use the technique of finding the values in the vectors generating the radiation diagrams. The two techniques shall be seen as essentially equivalent to each other.

According to act b), the antenna elements may be switched off or reduced by using antenna elements that may be manipulated, for example electronically.

By switching off interadjacent antenna elements at certain times, the time domain is used in order to achieve a better measuring accuracy. As mentioned above, the more separated the antenna elements the narrower the main lobe. However, the more separated the antenna elements the more grating lobes will appear.

By using the result from the first time $t_1$, it is possible to calculate a first range outside which range the grating lobes will appear in the second radiation diagram. Such calculation is known in prior art and may be carried out by using the relative distance between two antenna elements and the frequency used in the antenna array system. This calculation is also functional for subgroups of antenna element.

The range is calculated dependent on the antenna array configuration at the time. Below an example will be given in order to clarify the method of calculating the range.

W denotes the antenna array configuration at a certain time and the numbers denotes different subgroups of the antenna array configuration at the time. X denotes active antenna elements and a hyphen denotes a switched off or reduced antenna element.

W: xxx---xxx

This may be described in vector form as:

$$W(k)=[111000111] \ (1\times 9 \text{ vector}) \qquad (1)$$

The antenna array configuration may be divided into:

W1: x-----x

Vector form:

$$W1(k)=[1000001] \ (1\times 7 \text{ vector}) \qquad (2)$$

and:

W2: x x x

Vector form:

$$W2(k)=[111] \ (1\times 3 \text{ vector}) \qquad (3)$$

$$W(k)=W1(k)*W2(k) \ (1\times 9 \text{ vector}) \qquad (4)$$

where * denotes convolution.

From (2) it is possible to calculate the range by using a Fourier transform on (2). After that, the transform is set to zero and the complex zero that has the least angle is identified. The complex zero will appear on the unity circle as a pair of complex conjugates. The range may now be found as the distance between the complex zeroes along the unity circle. In order to get the distance in radians, a substitution of variables may be done according to:

$$\theta=\arcsin(u/dk) \qquad (5)$$

where u=the variable used in the Fourier transform and where d=the distance between the antenna elements and where k=the wave number.

If the change in the array configuration is known in advance, the range may be calculated in advance and may then be applied in the different radiation diagrams. The calculations may advantageously be done by a computer or the like.

The first range may be used for rejecting all parts of the second radiation diagram outside the first range, thereby excluding the ambiguities in the second radiation diagram due to grating lobes.

The first range determines where the maximum point of the main lobe can be found and where no grating lobes will appear. As mentioned before, the grating lobes may cause ambiguities since one of the grating lobes may appear to be the maximum point for the radiation diagram. If one of the grating lobes is used as the maximum point for the radiation diagram, the estimation of the direction of arrival of the target will be wrong. By using the first range, all grating lobes may be rejected and the maximum point for the main lobe can be calculated without any ambiguities stemming from the grating lobes.

After rejecting the grating lobes, the second radiation diagram may be used for calculating at which angle θ the maximum point for the main lobe appears in the second radiation diagram, with a narrower main lobe than in the first radiation diagram.

Act b) and act c may be repeated in time until the antenna array comprises only the two outermost antenna elements. This antenna configuration generates the narrowest main lobe with the lowest amplitude and the highest grating lobes. Thus, this configuration produces a radiation diagram where it may be difficult to find the maximum point for the main lobe. The grating lobes may actually be as high as the main lobe for some antenna configurations.

However, a new range and a new maximum have been calculated for every time when the antenna array configuration has changed. The grating lobes may be disregarded at each time and the maximum point for the main lobe may thus be calculated for the antenna configuration with only the outermost antenna elements. This enhances the measuring accuracy for the antenna array configuration and enables a better estimation of direction of arrival of a target.

The radiation diagrams comprise the values of the gain $G(\theta)$ versus the azimuth angle θ. Since the number of antenna elements at the second time $t_2$ is less than the maximum number of antenna elements, grating lobes will appear in the second radiation diagram. Consequently, since the antenna configuration at a third time $t_3$ has even lesser antenna elements, more grating lobes will appear in a third radiation diagram. In the second and third radiation diagram the grating lobes appear at different angles dependent on which and how many antenna elements that has been switched of or reduced. In the second radiation diagram the first grating lobes appear on each side of the main lobe at certain angles, e.g. $\theta_{t2}=X_{t2}$ radians (or degrees) and $\theta_{t2}=-X_{t2}$ radians (degrees). In the third radiation diagram the first grating lobes appear on each side of the main lobe at certain angles, e.g. $\theta_{t3}=X_{t3}$ radians (or degrees) and $\theta_{t3}=-X_{t3}$ radians (degrees). According to the technology, $X_{t2}$ is greater than $X_{t3}$ and $-X_{t2}$ is lesser than $X_{t3}$, i.e. the first grating lobes in the third radiation diagram appear closer to the main lobe than the first grating lobes in the second radiation diagram. The third radiation diagram presents a second range outside which the grating lobes will appear. According to the above the second range must be narrower than the first range.

However, the main lobe in the second and third radiation diagrams appears within every corresponding range if the SNR is high enough. Furthermore, the main lobe is narrower in the third radiation diagram than in the second radiation diagram and the second range is narrower than the first range, which is why the third radiation diagram shows a better measuring accuracy than the second radiation diagram after rejecting values outside each of the ranges.

In another example embodiment, a number of radiation diagrams will be produced for every antenna array configuration. The number of radiation diagrams may be used for calculating a mean value for the antenna array configuration, i.e. a mean value for the gain at different angles. A mean value may be calculated by any known methods e.g. Bartlett. Furthermore, when calculating a number of radiation diagrams for each time, it is possible to reject all radiation diagrams where the maximum is found/calculated outside the range. This increases the measuring accuracy since the desired maximum value for the main lobe may be found in at least one radiation diagram.

The technology may thus be used by dynamically altering the antenna array such that interadjacent antenna elements are switched off or reduced until only the outermost antenna elements remain.

The benefits of the technology will become apparent when describing the example embodiments below.

The amplitudes of the main lobes $G_{t1}(\theta_{main})$, $G_{t2}(\theta_{main})$ do not have to be global maximums in the radiation diagram, but may be local maximums. If the main lobe is not a global maximum, there will be an error in the resolution since the maximum point will be found outside the range and the grating lobes will thus generate a drastic increase in the standard deviation.

BRIEF DESCRIPTION OF DRAWINGS

The invention will now be described with reference to the drawings below.

DETAILED DESCRIPTION

The description of the different embodiments below shall not be seen as limiting for the invention, but merely as examples within the scope of the claims.

An antenna array 1 uses antenna elements 2 for receiving analog signals. The antenna array 1 is connected to an analog to digital converter that samples the analog signals and creates a digital signal. The digital signal comprises values from the analog signal at certain points in time. The values may be represented as the gain $G(\theta)$ versus the angle $\theta$. The values may be presented in a radiation diagram in order to illustrate the strength of the analog signal for different angles at certain points in time.

Figure 1:
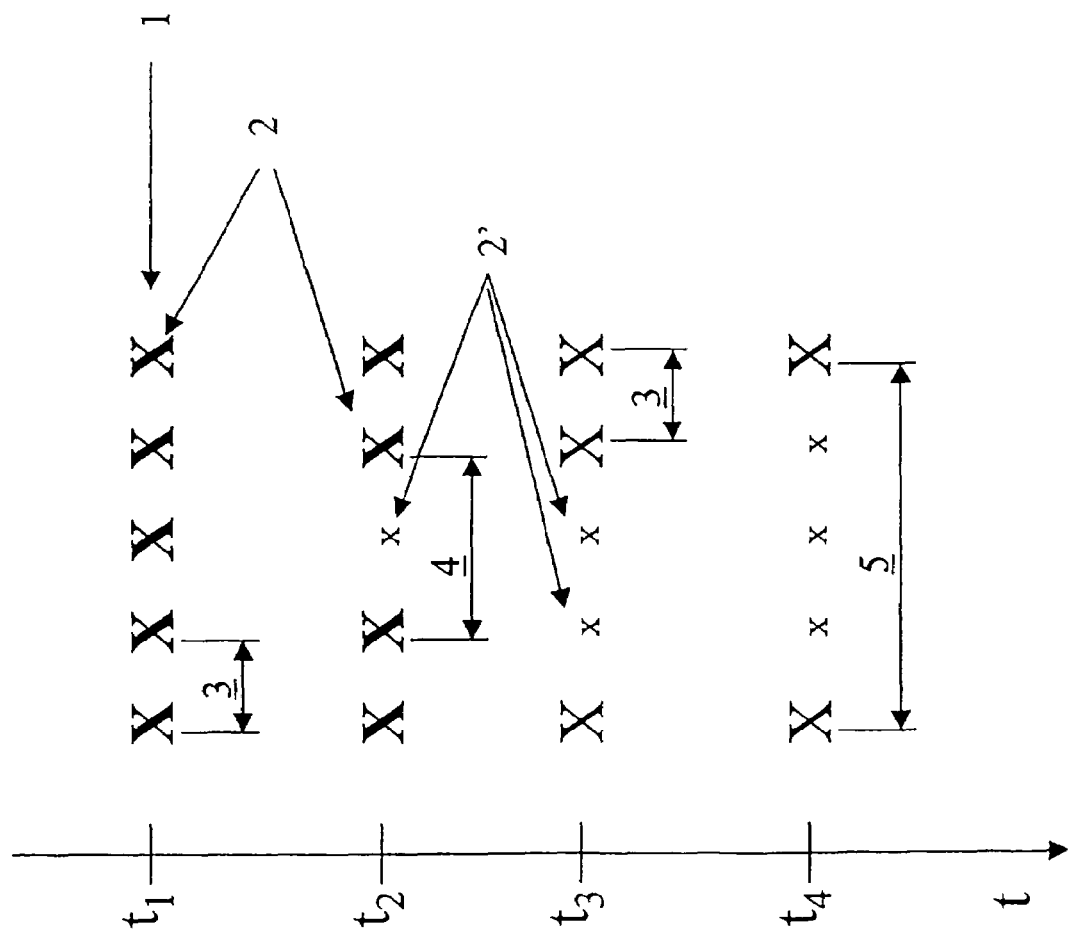
FIG. 1 shows an antenna array according to one example embodiment with a number of $t_1$-$t_4$ configurations in time.

FIG. 1 shows an antenna array 1 according to one example embodiment comprising five antenna elements 2, with a number of configurations in time. The antenna elements 2 are depicted with a large X. At the first time $t_1$ the antenna array 1 uses all of the antenna elements 2. At the second time $t_2$ the antenna array 1 uses all but one of the antenna elements 2. At the third time $t_3$ the antenna array 1 uses all but two of the antenna elements 2. At the fourth time $t_4$ the antenna array 1 uses all but three of the antenna elements 2. As can be seen in FIG. 1, the configuration of the antenna array 1 at the fourth time $t_4$ uses only the two most widely separated antenna elements 2.

"Not using" an antenna element or "removing" one antenna element; means that the signals from the antenna array 1 are reduced or blocked. This is advantageously done before the sampling of the signals, but may be carried out after the sampling. However, if the antenna elements 2 are to be reduced or blocked after the sampling, the system should require one sampling device per antenna element. In FIG. 1 the reduced antenna elements 2 are depicted with a small x and denoted with 2'.

In FIG. 1 the distance between the antenna elements is denoted 3, 4, 5. The distance between two antenna elements with a reduced antenna element in-between is denoted 4. The distance between two outermost antenna elements is denoted 5.

The use of different antenna elements 2 according to above increases the phase centre between subgroups of antenna elements 2. At the fourth time $t_4$, the distance 5 between the two outermost antenna elements 2 gives the maximum increase in phase centre for the antenna array 1 according to the embodiment. As has been described before, the increase in distance between the antenna elements 2 narrows the main lobe 6 (see FIG. 2) but decreases the amplitude. One drawback is the generation of grating lobes 7 (see FIG. 2) which may cause an increase in the standard deviation. However, for every increase in distance between the antenna elements 2 according to above, the closer to the main lobe 6 the grating lobes 7 will appear.

Figure 2:
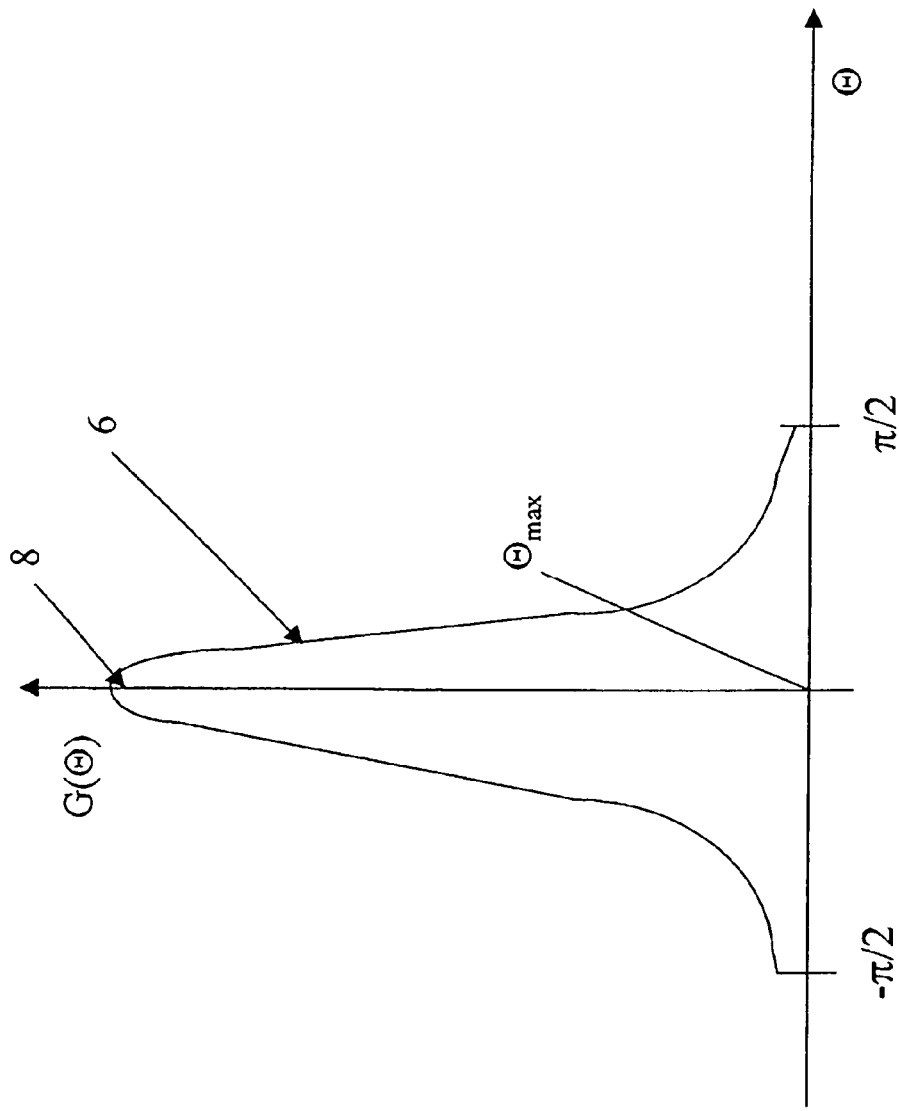
FIG. 2 schematically shows a radiation diagram, with the gain in the signal $G(\theta)$ versus the angle θ at the first time $t_1$ for the antenna array in FIG. 1.

FIG. 2 schematically shows a radiation diagram, with the gain in the signal $G(\theta)$ versus the angle $\theta$ for a full antenna array 1 corresponding to the first time $t_1$. If the distance 3 between the antenna elements 2 is equal to or less than half the wavelength, no grating lobes 7 (see FIG. 3) will appear. In this embodiment the distance 3 between the antenna elements 2 is equal to or less than half the wavelength. In FIG. 2 this becomes apparent since only a main lobe 6 appears in the radiation diagram. In this embodiment, there are no errors in the estimation of the direction-of-arrival since no grating lobes 7 appear. The maximum point 8 for the radiation diagram coincides with the apex of the main lobe 6. However, the width of the top of the main lobe 6 gives rise to uncertainty regarding the estimation of the direction-of-arrival.

As can be seen in FIG. 2, the antenna array 1 is advantageously operational where the angle $(\theta)$ is varied between $-\pi/2 - \pi/2$.

In FIG. 2 the main lobe 6 appears within the range of $-\pi/2 - \pi/2$.

Figure 3:
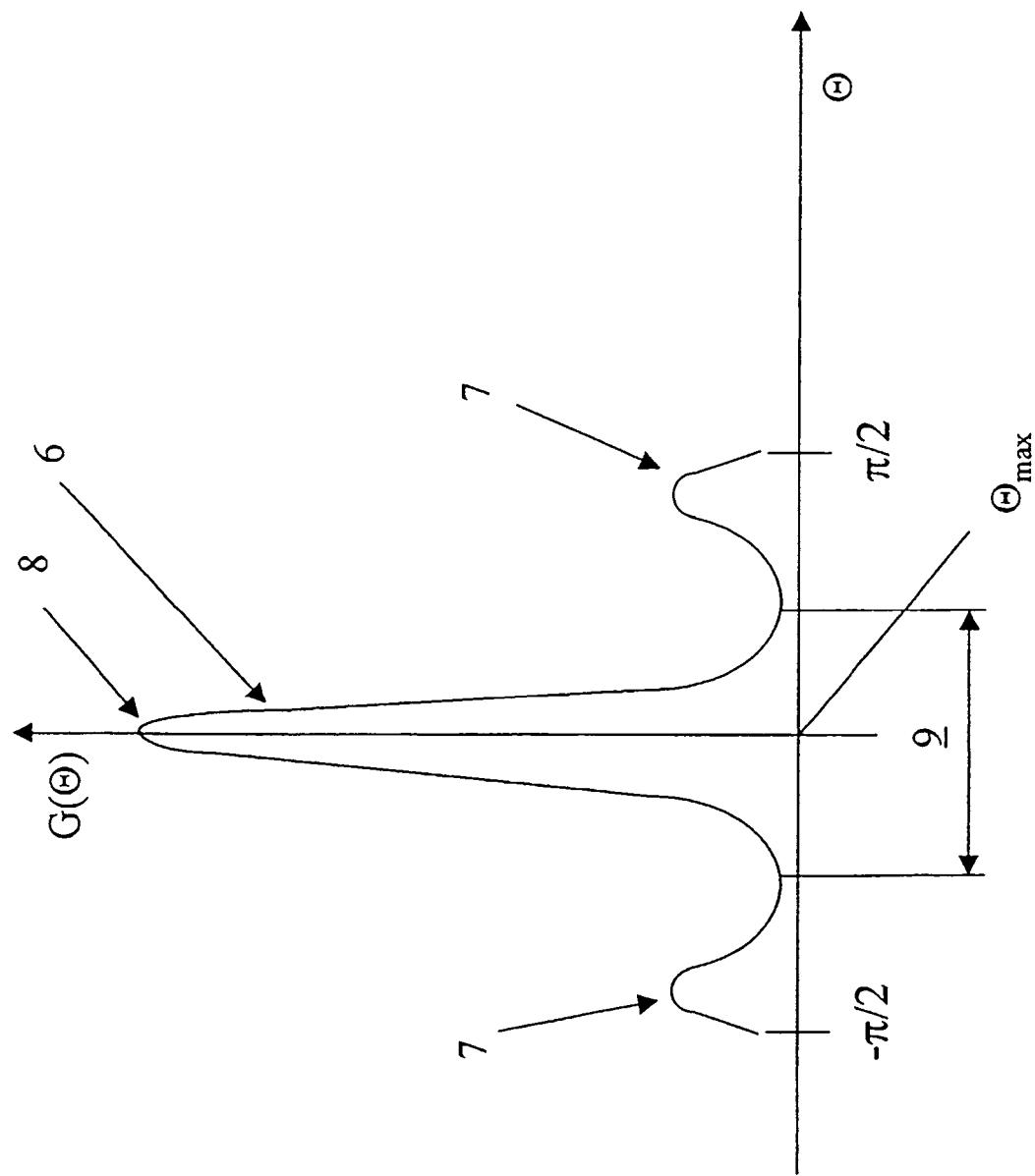
FIG. 3 schematically shows a radiation diagram, with the gain in the signal $G(\theta)$ versus the angle θ at the second time $t_2$ for the antenna array in FIG. 1.

FIG. 3 schematically shows a radiation diagram, with the gain in the signal $G(\theta)$ versus the angle $\theta$ for a reduced antenna array 1 corresponding to the second time $t_2$. Here the distance between the central antenna elements 2 is more than half the wavelength $\lambda$ which is why first grating lobes 7 appear in the radiation diagram. In FIG. 3 this becomes apparent since both a main lobe 6 and two grating lobes 7 appear in the radiation diagram. In this embodiment, the first grating lobes 7 give rise to an uncertainty regarding the estimation of the direction-of-arrival.

The maximum point 8 for the radiation diagram coincides with the apex of the main lobe, but the main lobe 6 has a lesser amplitude than at the first time $t_1$. However, the width of the top of the main lobe 6 is narrower than at the first time $t_1$ but still gives rise to uncertainty.

In FIG. 3, the first grating lobes 7 appear outside a first range 9, essentially symmetrically around the main lobe 6. The first range 9 extends between the minimum points 12 between the main lobe 6 and the first grating lobes 7.

Figure 4:
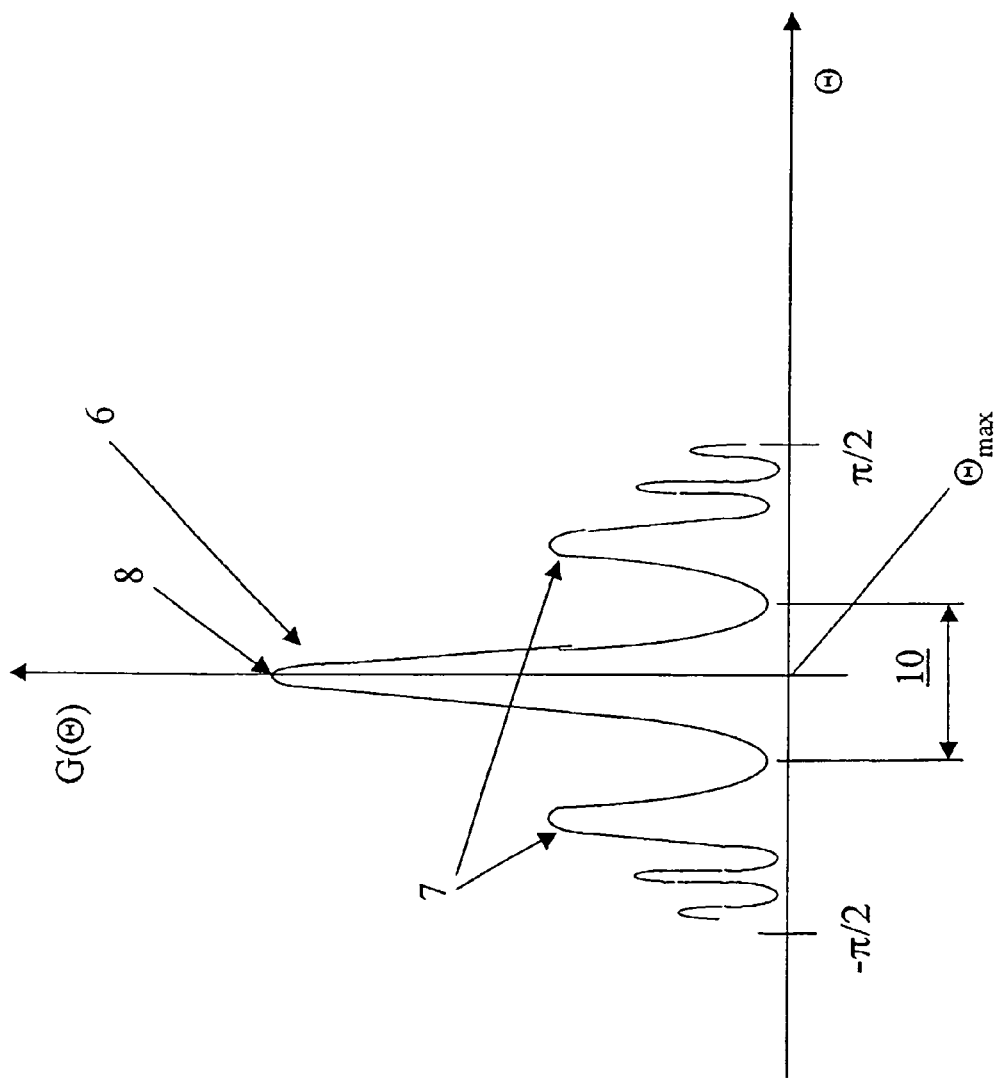
FIG. 4 schematically shows a radiation diagram, with the gain in the signal $G(\theta)$ versus the angle θ at the third time $t_3$ for the antenna array in FIG. 1.

FIG. 4 schematically shows a radiation diagram, with the gain in the signal $G(\theta)$ versus the angle $\theta$ for a reduced antenna array 1 corresponding to the third time $t_3$. Here the distance 6 between the central antenna elements 2 is even greater than at the second time $t_2$ which is why even more grating lobes 7 appear in the radiation diagram. In FIG. 4 this becomes apparent since both a main lobe 6 and several grating lobes 7 appear in the radiation diagram. The first grating lobes 7 at the third time $t_3$ appear closer to the main lobe 6 than at the second time $t_2$ and also have greater amplitude. In this embodiment, the grating lobes 7 give rise to even greater uncertainty regarding the estimation of the direction-of-arrival, since they are higher and the main lobe 6 smaller.

The maximum point 8 for the radiation diagram coincides with the apex of the main lobe, but the main lobe 6 has a lesser amplitude than at the second time $t_2$, which is why the ratio between the main lobe 6 and the first grating lobes 7 has diminished compared to the ratio at the second time. However, the width of the top of the main lobe 6 is narrower than at the first time $t_1$ but still gives rise to uncertainty.

In FIG. 4, the grating lobes 7 appear outside a second range 10, essentially symmetrically around the main lobe 6. The second range 10 extends between the minimum points 12 between the main lobe 6 and the first grating lobes 7.

Figure 5:
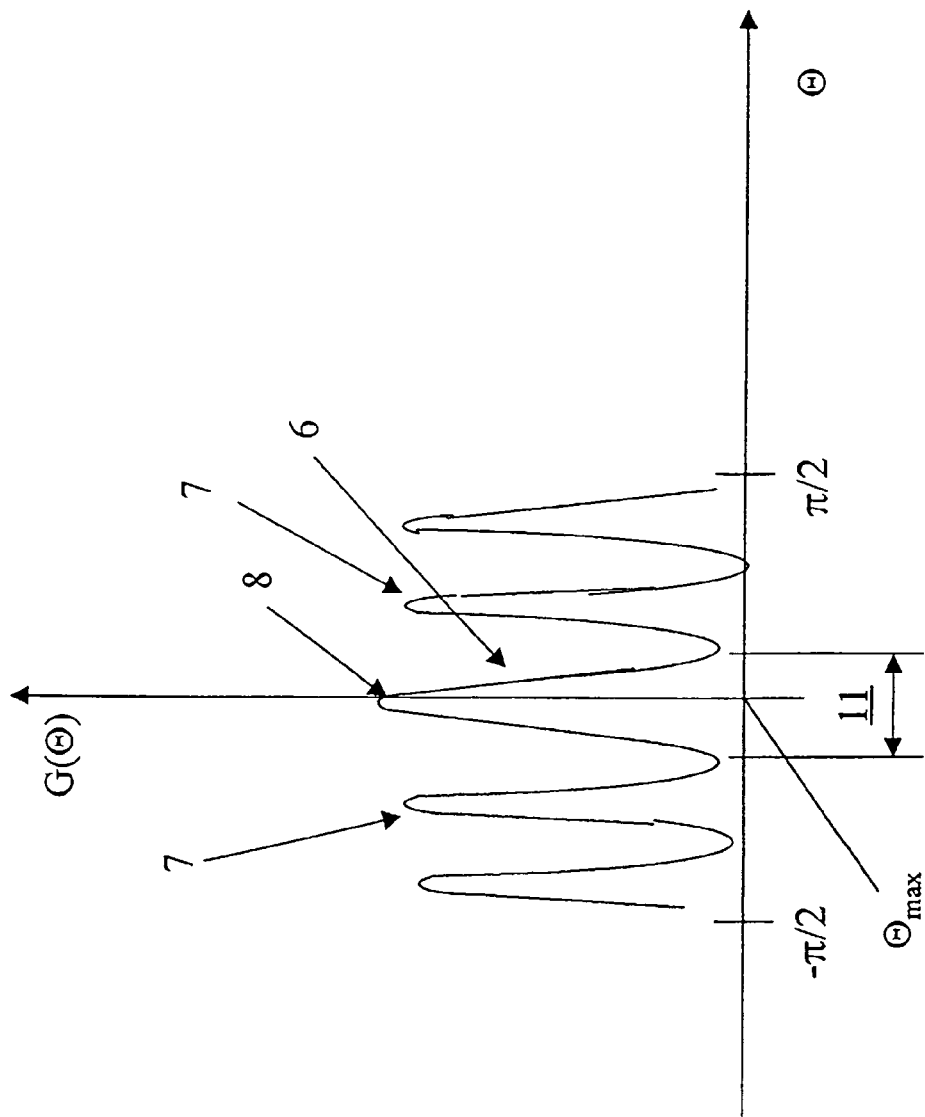
FIG. 5 schematically shows a radiation diagram, with the gain in the signal $G(\theta)$ versus the angle θ at the fourth time $t_4$ for the antenna array in FIG. 1.

FIG. 5 schematically shows a radiation diagram, with the gain in the signal $G(\theta)$ versus the angle $\theta$ for a reduced antenna array 1 corresponding to the fourth time $t_4$. In this embodiment the antenna array 1 configuration only comprises the two outermost lying antenna elements 2. This may be compared to a spatial two-element comb filter. Here the distance 6 between the central antenna elements 2 is thus even greater than at the third time $t_3$ which is why even more grating lobes 7 appear in the radiation diagram. In FIG. 5 this becomes apparent since both a main lobe 6 and several grating lobes 7 appear in the radiation diagram. The first grating lobes 7 at the fourth time $t_4$ appear closer to the main lobe 6 than at the second time $t_2$ and also have greater amplitude. Actually, all grating lobes 7 in FIG. 5 theoretically have the same amplitude. (compare to the previously known spatial two-element comb filter) In this embodiment, the grating lobes 7 give rise to even greater uncertainty regarding the estimation of the direction-of-arrival.

The maximum point 8 for the radiation diagram coincides with the apex of the main lobe, but the main lobe 6 has a lesser amplitude than at the third time $t_3$, which is why the ratio between the main lobe 6 and the first grating lobes 7 has diminished compared to the ratio at the third time. In FIG. 5 the amplitudes of the first grating lobes 7 are essentially as high as for the main lobe 6. This configuration of the antenna array 1 gives rise to a large uncertainty for the estimation of the direction-of-arrival of a target, since it is not obvious that the target will appear in the main lobe, but may appear in one of the closest grating lobes 7.

However, the width of the top of the main lobe 6 at the fourth time $t_4$ is the most narrow compared to all of the other antenna configurations. If it is certain that the target appears in the main lobe, the narrow top of the main lobe 6 gives a good estimation of direction-of-arrival. One problem thus to be solved is the uncertainty which is dependent on the grating lobes 7.

In FIG. 5, the grating lobes 7 appear outside a third range 11, essentially symmetrically around the main lobe 6. The third range 11 extends between the minimum points 12 between the main lobe 6 and the first grating lobes 7.

One important aspect, however, is that the centre line of the main lobe 6 for FIGS. 2-5 is mainly stationary (if the surrounding is stationary for all the antenna array 1 configurations in time), i.e. has not moved, for all the times $t_1$-$t_4$, but the first grating lobes 7 have moved closer to the main lobe 6 the more separated the antenna elements 2 are. The centre line for the main lobe 6 at different times may change somewhat dependent on the magnitude of noise or other phenomena that may disturb the signal. However, the main lobe 6 will always appear within the calculated range which is why the maximum point 8 for the main lobe 6 at each time $t_n$ is easy to calculate.

Figure 6:
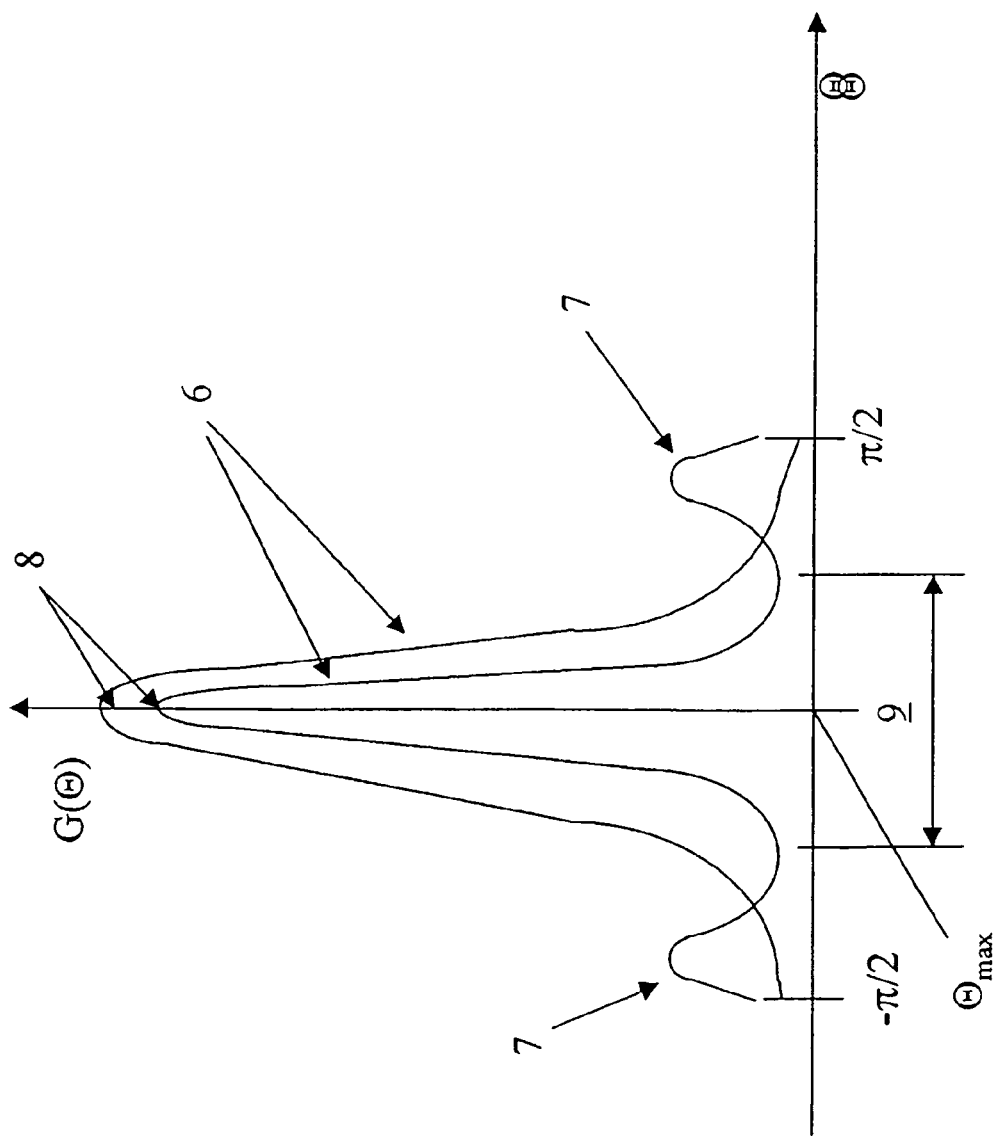
FIG. 6 shows the radiation diagram in FIG. 3 overlapping the radiation diagram in FIG. 2.

FIG. 6 shows the radiation diagram in FIG. 2 overlapping the radiation diagram in FIG. 3. As can be seen in FIG. 6, the centre line of the main lobes 6 has not moved. However, the grating lobes 7 from the radiation diagram in FIG. 3 (i.e. at the second time $t_2$) have moved closer to the centre of the main lobes 6 than the grating lobes 7 from the radiation diagram in FIG. 2 (i.e. at the first time $t_1$). Furthermore, it becomes obvious from FIG. 6 that the main lobe 6 at the second time $t_2$ is more narrow but with less amplitude than the main lobe 6 at the first time. FIG. 6 also shows the second range 10 being smaller than the first range 9.

Figure 7:
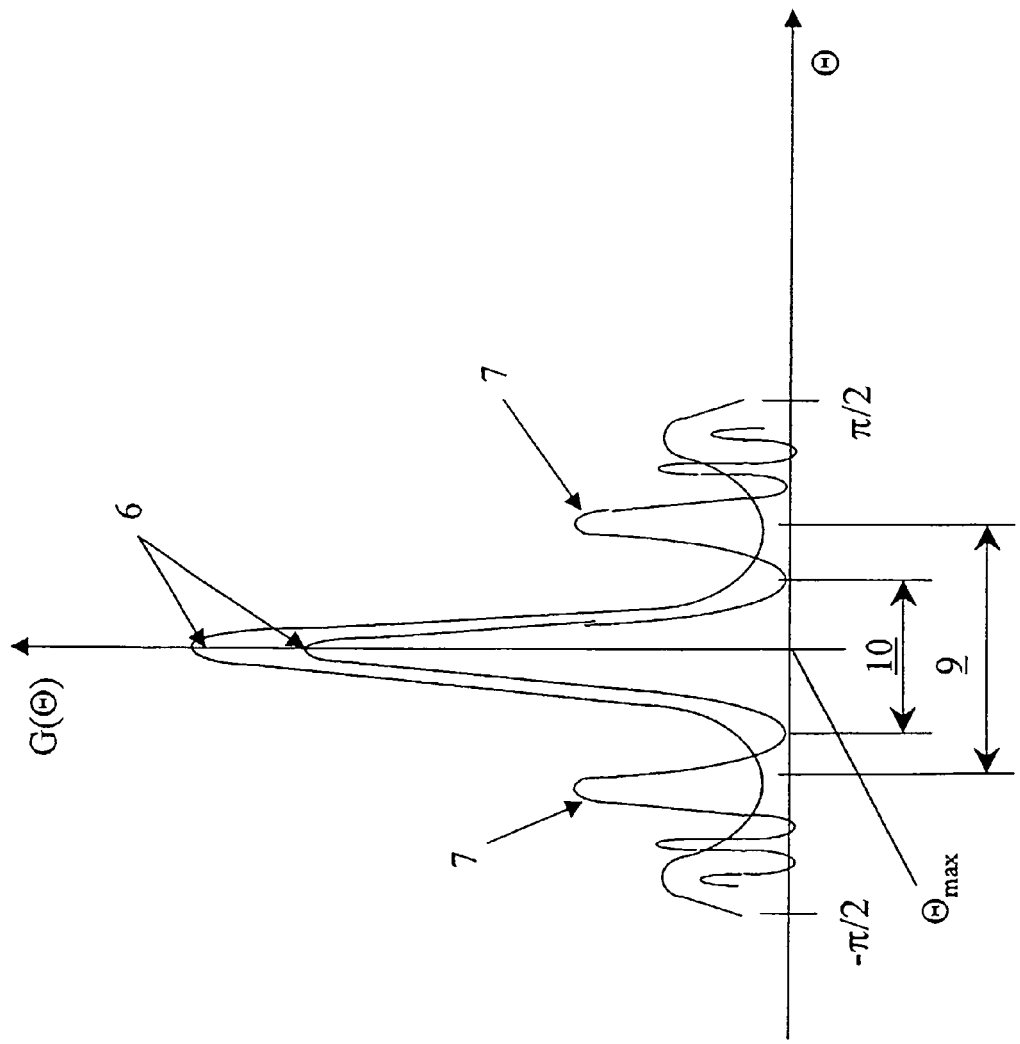
FIG. 7 shows the radiation diagram in FIG. 4 overlapping the radiation diagram in FIG. 3.

FIG. 7 shows the radiation diagram in FIG. 3 overlapping the radiation diagram in FIG. 4. As can be seen in FIG. 7, the centre line of the main lobes 6 has not moved. However, the grating lobes 7 from the radiation diagram in FIG. 4 (i.e. at the third time $t_3$) have moved closer to the centre of the main lobes 6 than the grating lobes 7 from the radiation diagram in FIG. 3 (i.e. at the second time $t_2$). Furthermore, it becomes obvious from FIG. 7 that the main lobe 6 at the third time $t_3$ is more narrow but with less amplitude than the main lobe 6 at the second time $t_2$. FIG. 7 also shows the third range 11 being smaller than the second range 10.

Figure 8:
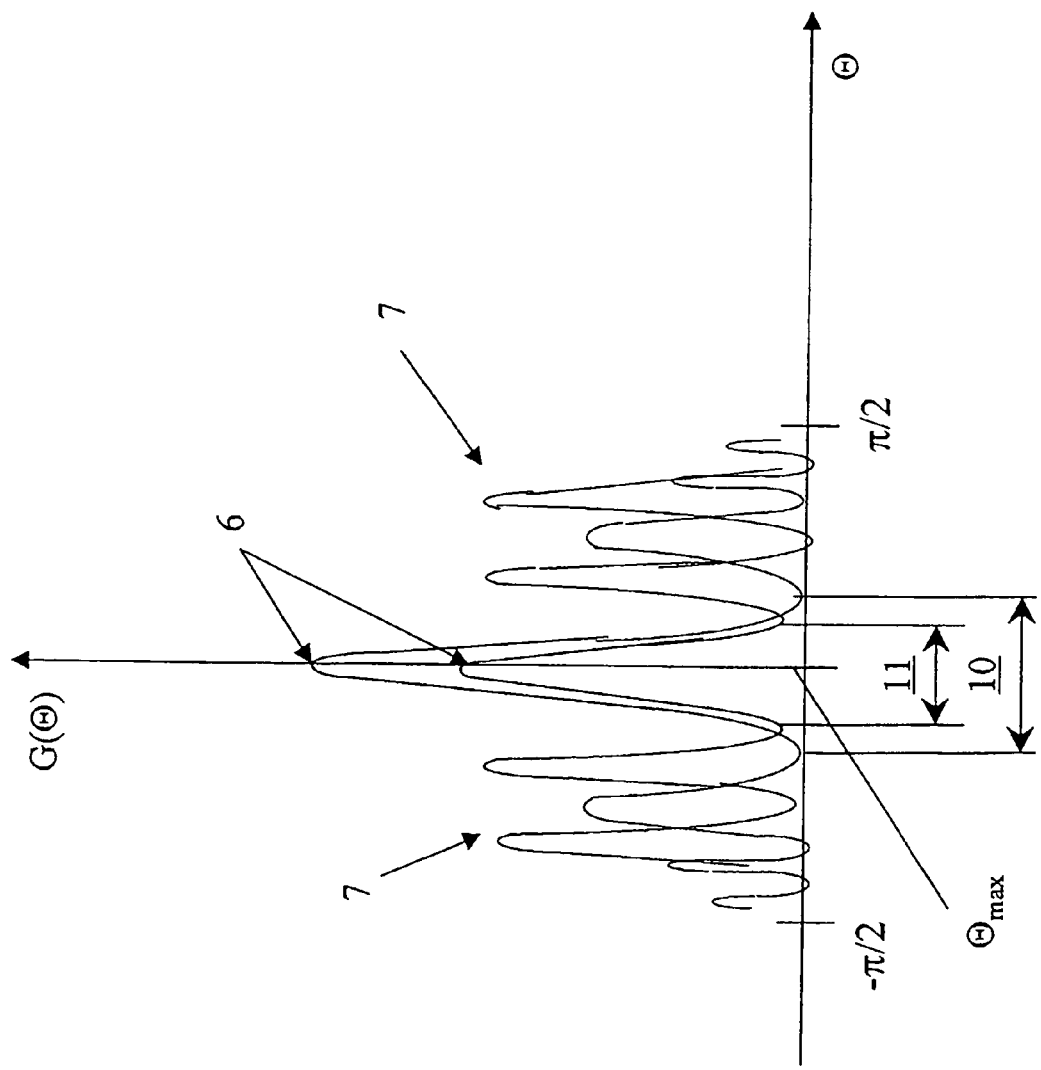
FIG. 8 shows the radiation diagram in FIG. 5 overlapping the radiation diagram in FIG. 4.

FIG. 8 shows the radiation diagram in FIG. 4 overlapping the radiation diagram in FIG. 5. As can be seen in FIG. 8, the centre line of the main lobes 6 has not moved. However, the grating lobes 7 from the radiation diagram in FIG. 5 (i.e. at the fourth time $t_3$) have moved closer to the centre of the main lobes 6 than the grating lobes 7 from the radiation diagram in FIG. 3 (i.e. at the third time $t_3$). Furthermore, it becomes obvious from FIG. 8 that the main lobe 6 at the fourth time $t_4$ is more narrow but with less amplitude than the main lobe 6 at the third time $t_3$. FIG. 8 also shows the fourth range being smaller than the third range 11.

The grating lobes 7 will appear closer to the main lobe 6 for each time that an antenna element 2 is removed and the main lobe 6 will become narrower. In *figs*. 6-8 the advantage of the technology is apparent, where the rejection of the grating lobes 7 for the different times generate a possibility to gain a narrow main lobe 6 that enables a good measuring accuracy of a target.

Figure 9:
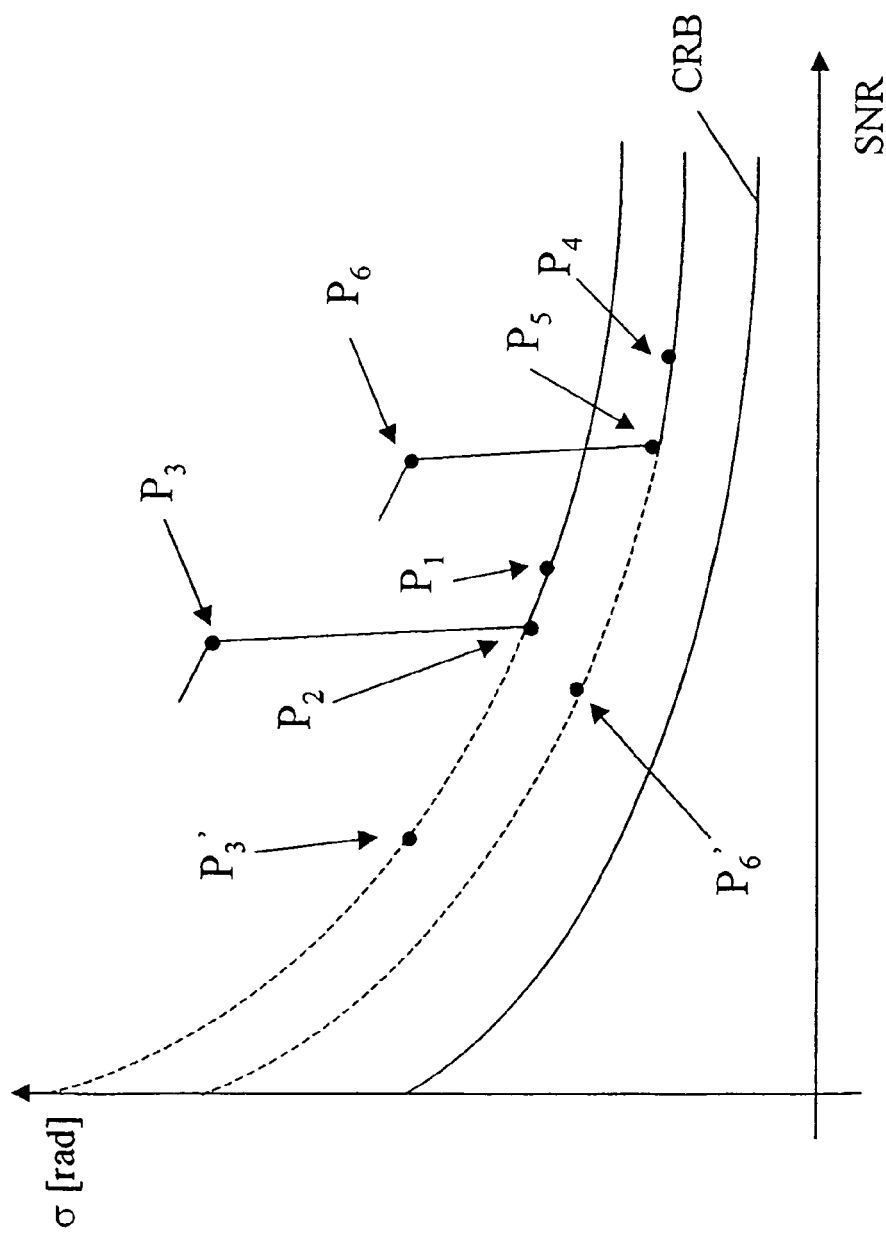
FIG. 9 schematically shows a graph depicting Cramér-Rao Lower Boundary (CRB), and the standard deviation σ versus the Signal to Noice Ratio (SNR) when using reduced antenna-array.

FIG. 9 schematically shows a graph depicting the Cramér-Rao Lower Boundary (CRB) and the standard deviation $\sigma$ versus the Signal to Noise Ratio (SNR). The standard deviation is a deviation of the angle. FIG. 9 also shows a first point $P_1$ at a certain distance from CRB and a second point $P_2$ at a second location. The first point $P_1$ has a higher SNR and consequently a lower standard deviation $\sigma$ than the second point $P_2$. However, a lower SNR allows more noise in the signal, which is why the antenna array 1 may be used for detecting a target at a further distance (or a smaller target) than with a system at the first point $P_1$, if the increase in the standard deviation can be accepted.

The first point and the second point $P_1$, $P_2$ symbolise an antenna array 1 system with decreased SNR from the first point $P_1$ to the second point $P_2$ along the CRB. At $P_2$ there is a threshold to a third point $P_3$. The threshold is a result of grating lobes 7 appearing at lower SNR. The grating lobes 7 give rise to an uncertainty of the angular estimation to the target.

FIG. 9 shows that a SNR higher than at point two, $P_2$, gives a good probability of estimation of direction-of-arrival of a target at the main lobe 6. However this is only true if the maximum point of the radiation diagram coincides with the maximum point 8 of the main lobe 6. With a lower SNR than at the second point $P_2$, it is not certain that the maximum point of the radiation diagram is where the maximum point 8 for the main lobe 6 is, but the maximum point might be deemed by the system to be at one of the closest grating lobes 7. If this is the case, the estimation of direction-of-arrival of a target will be carried out at one of the grating lobes 7.

If one of the grating lobes 7 has been deemed by the system to be the maximum point and if the amplitude of the grating lobes 7 is lesser than the amplitude of the main lobe, the distance from the top of the main lobe 6 to the top of the grating lobes 7 may be greater than the width of the top of the main lobe 6. This gives rise to a considerable increase in the uncertainty for the estimation of direction-of-arrival of a target and thus an increase of the standard deviation.

When reducing the array according to the technology the width of the main lobe 6 will decrease, and the threshold will move closer to the CRB with a demand for a higher SNR, than for the previous configuration of the array. This is depicted in FIG. 9 where the second point $P_2$ has moved to the fourth point $P_4$.

As pointed out before, the decrease of the main lobe 6 width decreases the standard deviation $\sigma$, but puts a demand for a higher SNR. This has been pointed out in FIG. 9 as moving the first, second and the third points $P_1$, $P_2$ and $P_3$ to the corresponding fourth, fifth and sixth points $P_4$, $P_5$ and $P_6$.

As pointed out before, one problem with separating the antenna elements 2 is that at one point, grating lobes 7 will appear in the radiation diagram due to the separation. The grating lobes 7 will generate a decrease of probability of estimation of direction-of-arrival of the target. The target will randomly appear in the grating lobes 7 as a defect estimation of the direction-of-arrival. The sudden appearance of grating lobes 7, and thus the decrease of probability, is manifested in FIG. 9 as a jump from the second point $P_2$ to a third point $P_3$. The third point $P_3$ has a higher degree of standard deviation $\sigma$ than the second point $P_2$ for essentially the same SNR.

According to the technology, the rejection of the grating lobes 7 outside the ranges for the different radiation diagrams, removes the jump from the second point $P_2$ to a third point $P_3$ as well as the jump from the fifth point $P_5$ to a sixth point $P_6$. This is due to the fact that there will be no errors when calculating the maximum point 8 for the main lobe 6 since there are no maximum points from grating lobes 7 that can give rise to an error. In fig 9, this is depicted as moving the third point $P_3$ to the third point prime $P_3'$ and as moving the sixth point $P_6$ to the sixth point prime $P_6'$.

Figure 10:
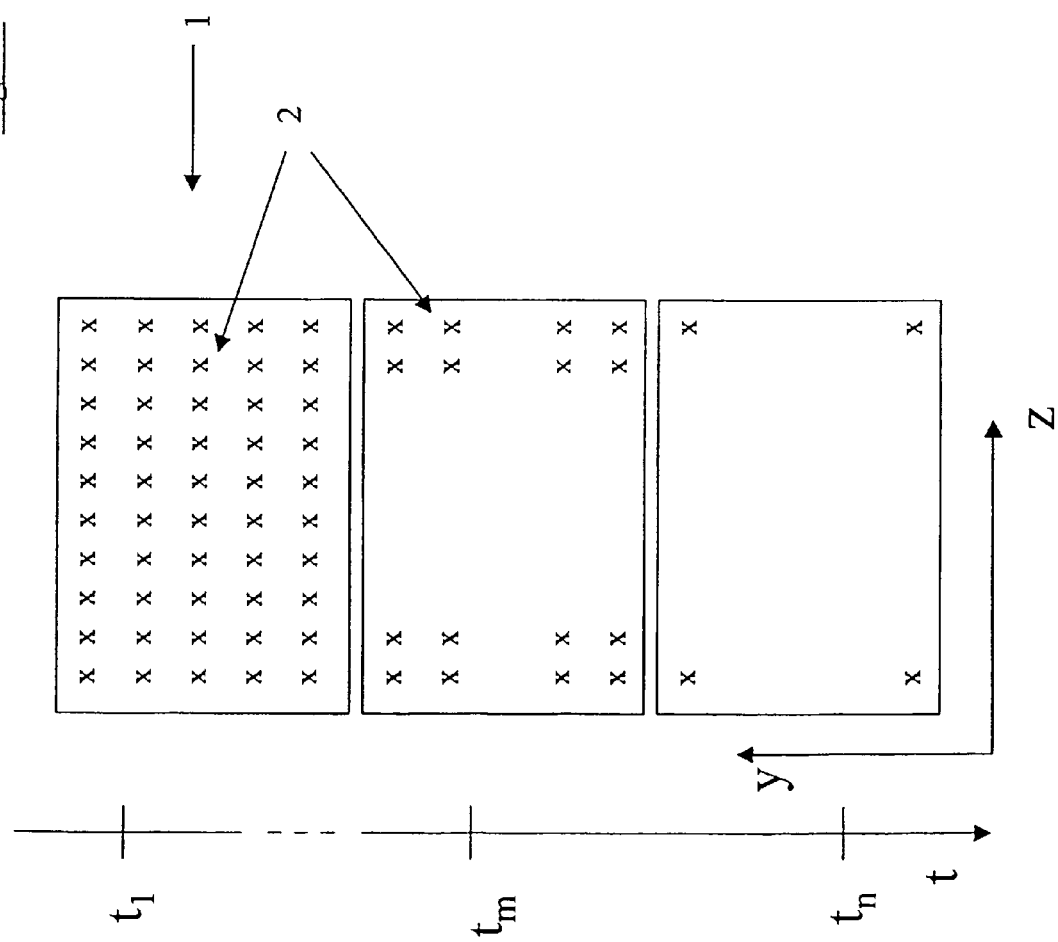
FIG. 10 schematically shows a two-dimensional antenna array with different configurations at different times.
Figure 11:
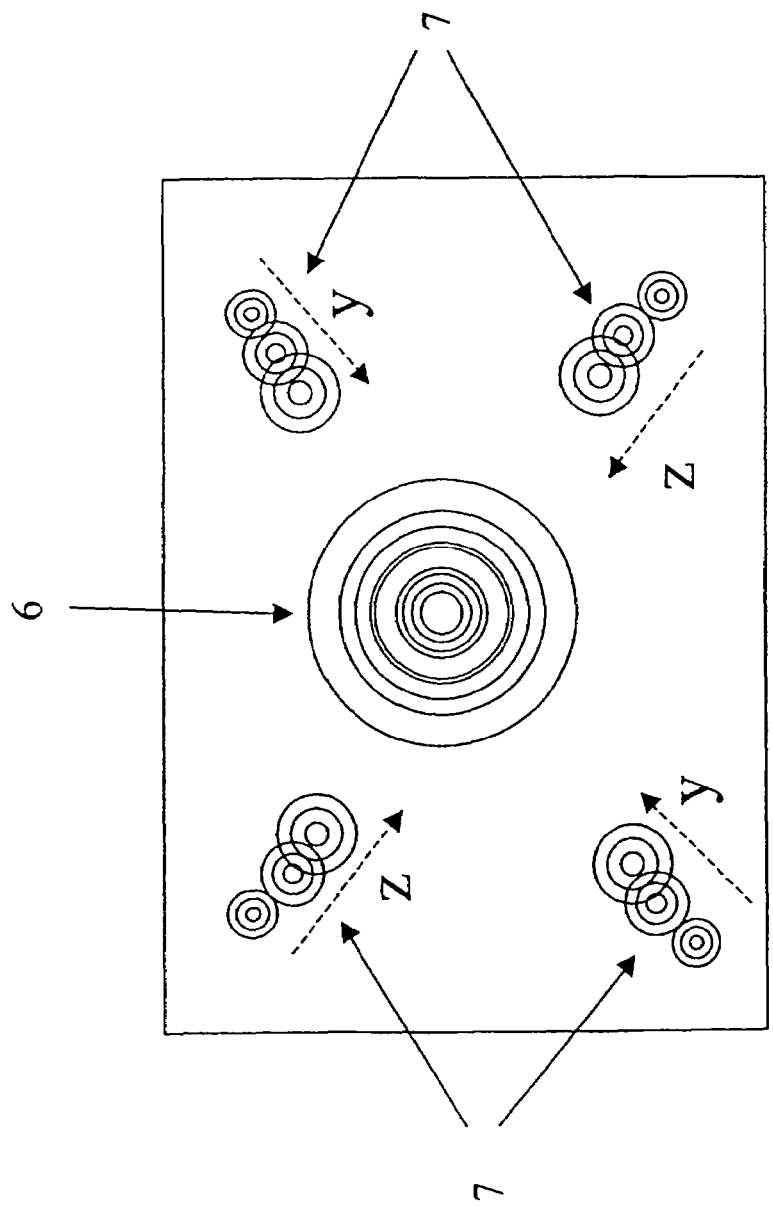
FIG. 11 diagrammatically shows a block diagram over the method according to one example embodiment.

FIG. 10 shows a two-dimensional antenna array 1 system according to one example embodiment, with a number of configurations in time $t_l$, $t_m$, $t_n$. The antenna array 1 system comprises five rows along an Y-axis. Each row comprises ten antenna elements 2 along a Z-axis. The antenna elements 2 are reduced or switched off in the same manner as described in FIG. 1. The technology described above is thus possible to use on two-dimensional antenna arrays FIG. 11 shows a frontal radiation diagram of an antenna array 1 system according to FIG. 10. The displacement of the grating lobes 7 towards the centre of the main lobes 6 has been depicted as a number of grating lobes 7 on an Z-axis on opposite sides of the main lobes 6 and a number of grating lobes 7 on an Y-axis on opposite sides of the main lobes 6. The displacement of the grating lobes 7 along the Z-axis corresponds to the removal of antenna elements 2 along the Z-axis in FIG. 10. The displacement of the grating lobes 7 along the Y-axis corresponds to the removal of antenna elements 2 along the Y-axis in FIG. 10.

The technology may be used for a two-dimensional array as depicted in FIG. 10. FIG. 11 shows that the reduction of the two-dimensional antenna array 1 gives diminished ranges for the grating lobes 7 and a diminished width of the main lobe, as for the one-dimensional antenna array 1 as depicted in FIG. 1. The grating lobes 7 may thus be rejected in a two-dimensional antenna array 1 system according to the above method.

Figure 12:
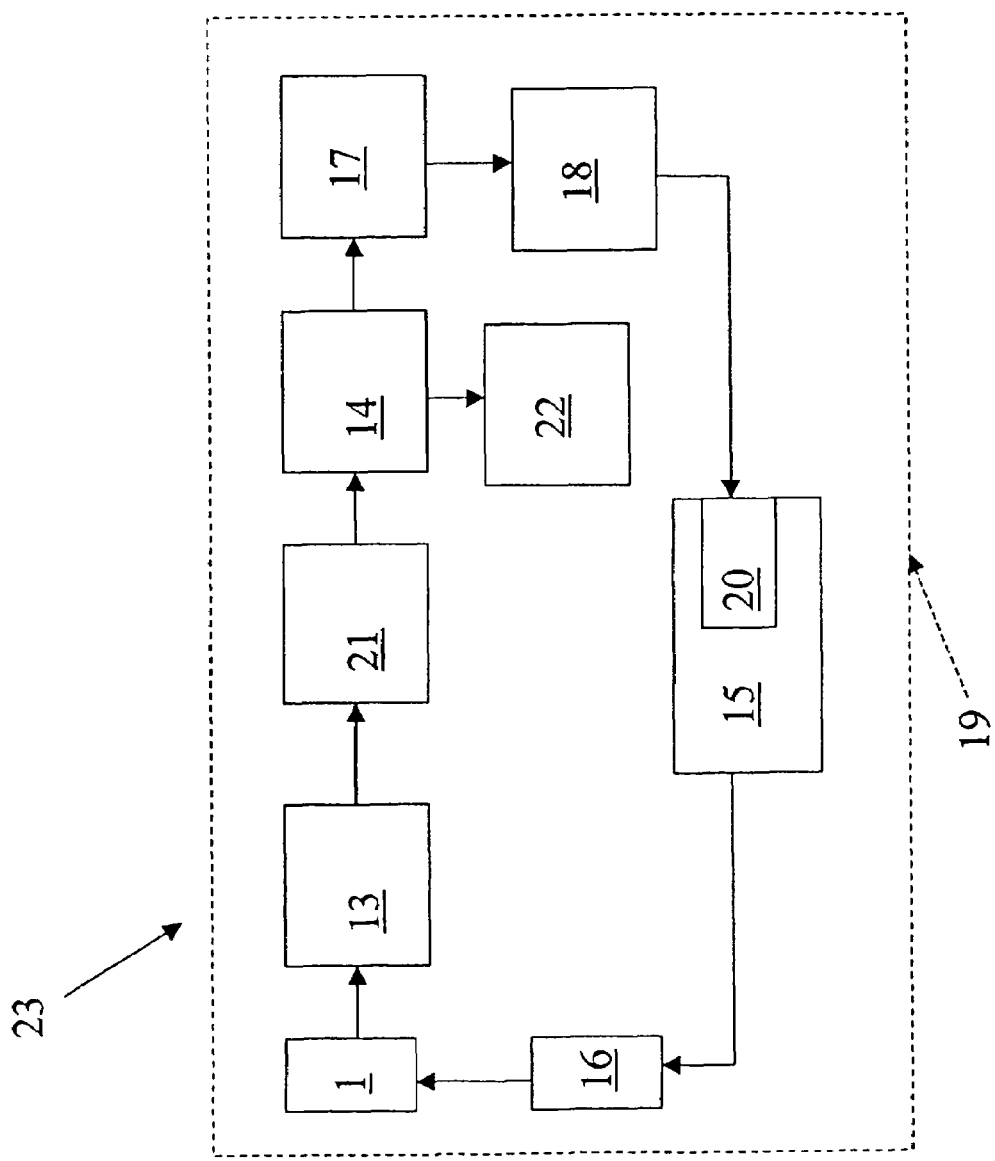
FIG. 12 diagrammatically shows a block diagram over the method according to the invention according to one embodiment.

FIG. 12 shows a block diagram over the method according to one example embodiment. The blocks in FIG. 12 depict a number of means suitable for performing the method.

FIG. 12 shows an antenna array 1 system 23 comprising means for enhancing the measuring accuracy in an antenna array 1 comprising a number of antenna elements 2. The antenna array 1 system 23 comprises;
- means 13 for receiving analog signals with the antenna array 1 elements, and;
- means 14 for producing values for a radiation diagram from the signals.

The antenna array 1 system 23 is characterized in that the antenna array 1 comprises;
- a)—means 13 for receiving analog signals on all antenna elements 2 at a first time $t_1$;
- means 14 for producing first values for a first radiation diagram from the values in the signals from the first time $t_1$, and;
- means 15 for finding the maximum point 8 for the first values,
- b)—means 16 for switching off or reducing the signal from one interadjacent antenna element 2 at a second time $t_2$;
- means 13 for receiving analog signals on all antenna elements 2 except from the one switched off or reduced antenna element, and;
- means 14 for producing second values for a second radiation diagram from the values in the signals from the second time $t_2$;
- c)—means 17 for using the first values to calculate a first range 9 referring to the second radiation diagram, outside which first range 9 grating lobes 7 will appear in the second radiation diagram;
- means 18 for rejecting all values outside the first range 9, and;
- means 15 for finding the maximum point 8 for the second values.

When using a full array there will be no grating lobes which is why the antenna array 1 system 23 will not calculate a range nor will the system reject any grating lobes at. Therefore, in FIG. 12, the means 17 for using values to calculate a range and means 18 for rejecting all values outside such a range, will not be used for the first cycle.

The system comprises means 19 for repeating act b) and act c) such that the antenna configuration dynamically is altered such that interadjacent antenna elements 2 are switched off or reduced until only the outermost antenna elements 2 remain.

The means 15 for finding the maximum point 8 for the values comprises means 20 for calculating at what angle $\theta_{max}$ the maximum point 8 for the main lobe 6 appears in a radiation diagram.

The system comprises means 21 for converting the analog signals to digital signals by sampling.

The system comprises means 22 for producing a radiation diagram from the values.

The antenna elements 2 have a relative distance 3 such that no grating lobes 7 will occur when using all elements in a full array.

The above mentioned means may be any suitable devices for handling signals and for performing mathematical tasks, for example a computer.

The embodiments above have been described as removing a number of antenna elements 2, but by removing it is to be understood that the antenna elements 2 are dampened or reduced rather than removed.

Furthermore the invention can be used for the same frequency between the different times or for different frequencies.

The invention is not limited to the embodiments above, but may be amended within the scope of the claims.

The invention claimed is:

1. A method for enhancing the measuring accuracy in an antenna array comprising a number of antenna elements, the method comprising;
  a)—receiving analog signals on all antenna elements of the antenna array at a first time $t_1$;
  producing first values for a first radiation diagram from values in the signals from the first time $t_1$, and;
  finding a maximum point for the first values,
  b)—switching off or reducing the signal from one interadjacent antenna element at a second time ($t_2$);
  receiving analog signals on all antenna elements except from the one switched off or reduced antenna element, and;
  producing second values for a second radiation diagram from values in the signals from the second time ($t_2$);
  c)—using the first values to calculate a first range referring to the second radiation diagram, outside which the first range grating lobes will appear in the second radiation diagram;
  rejecting all values outside the first range, and;
  finding a maximum point for the second values.

2. The method according to claim 1, further comprising repeating act b) and act c) whereby an antenna configuration is dynamically altered such that interadjacent antenna elements are switched off or reduced until only the outermost antenna elements remain.

3. The method according to claim 1, wherein the act of finding the maximum point for the values comprises calculating at which angle ($\theta_{max}$) the maximum point for the main lobe appears in a radiation diagram.

4. The method according to claim 1, further comprising converting the analog signals to digital signals by sampling.

5. The method according to claim 1, further comprising producing a radiation diagram from the values.

6. The method according to claim 1, wherein the antenna elements have a relative distance such that no grating lobes occur when using all elements in a full array.

7. An antenna array system comprising:
- an antenna array comprising a number of antenna elements;
- means for receiving analog signals with the antenna array elements, and;
- means for producing values for a radiation diagram from the signals,
- a) means for receiving analog signals on all antenna elements of the antenna array at a first time ($t_1$);
- means for producing first values for a first radiation diagram from values in the signals from the first time ($t_1$), and;
- means for finding a maximum point for the first values,
- b) means for switching off or reducing the signal from one interadjacent antenna element at a second time ($t_2$);
- means for receiving analog signals on all antenna elements except from the one switched off or reduced antenna element, and;
- means for producing second values for a second radiation diagram from values in the signals from the second time ($t_2$);
- c) means for using the first values to calculate a first range referring to the second radiation diagram, outside which first range grating lobes appear in the second radiation diagram;
- means for rejecting all values outside the first range, and;
- means for finding a maximum point for the second values.

8. An antenna array system according to claim 7, further comprising means for repeating act b) and act c) whereby that an antenna configuration is dynamically altered such that interadjacent antenna elements are switched off or reduced until only the outermost antenna elements remain.

9. An antenna array system according to claim 7, further comprising means for finding the maximum point for the values comprises means for calculating at what angle ($\theta_{max}$) the maximum point for the main lobe appears in a radiation diagram.

10. An antenna array system according to claim 7, further comprising means for converting the analog signals to digital signals by sampling.

11. An antenna array system according to claim 7, further comprising means for producing a radiation diagram from the values.

12. An antenna array system according to claim 7, wherein the antenna elements have a relative distance such that no grating lobes (7) will occur when using all elements in a full array.

13. A computer program product comprising instructions stored on a storage medium which, when executed, perform the acts of:
- receiving analog signals on all antenna elements of an antenna array at a first time $t_1$;
- producing first values for a first radiation diagram from values in the signals from the first time $t_1$;
- finding a maximum point for the first values, switching off or reducing the signal from one interadjacent antenna element at a second time ($t_2$);
- receiving analog signals on all antenna elements except from the one switched off or reduced antenna element;
- producing second values for a second radiation diagram from values in the signals from the second time ($t_2$);
- using the first values to calculate a first range referring to the second radiation diagram, outside which the first range grating lobes will appear in the second radiation diagram;
- rejecting all values outside the first range, and;
- finding a maximum point for the second values.

* * * * *

UNITED STATES PATENT AND TRADEMARK OFFICE
CERTIFICATE OF CORRECTION

| | |
|---|---|
| PATENT NO. | : 7,372,402 B2 |
| APPLICATION NO. | : 10/520932 |
| DATED | : May 13, 2008 |
| INVENTOR(S) | : Numminen |

It is certified that error appears in the above-identified patent and that said Letters Patent is hereby corrected as shown below:

On the Face Page, in Field (73), under "Assignee", in Column 1, Line 1, delete "Telfonaktiebolaget" and insert -- Telefonaktiebolaget --, therefor.

On the Face Page, in Field (57), under "ABSTRACT", in Column 2, Line 7, delete "b)—reducing" and insert -- b) reducing --, therefor.

In Column 1, Line 40, delete "Noice" and insert -- Noise --, therefor.

In Column 2, Line 35, delete "angle" and insert -- angles --, therefor.

In Column 3, Line 22, delete "a)—receiving" and insert -- a) receiving --, therefor.

In Column 3, Line 28, delete "b)—switching" and insert -- b) switching --, therefor.

In Column 3, Line 35, delete "c)—using" and insert -- c) using --, therefor.

In Column 5, Line 21, delete "act c" and insert -- act c) --, therefor.

In Column 6, Line 53, delete "Noice" and insert -- Noise --, therefor.

In Column 11, Line 52, delete "a)—means" and insert -- a) means --, therefor.

In Column 11, Line 59, delete "b)—means" and insert -- b) means --, therefor.

UNITED STATES PATENT AND TRADEMARK OFFICE
CERTIFICATE OF CORRECTION

PATENT NO. : 7,372,402 B2
APPLICATION NO. : 10/520932
DATED : May 13, 2008
INVENTOR(S) : Numminen It is certified that error appears in the above-identified patent and that said Letters Patent is hereby corrected as shown below:

In Column 12, Line 1, delete "c)—means" and insert -- c) means --, therefor.

In Column 12, Line 48, in Claim 1, delete "a)—receiving" and insert -- a) receiving --, therefor.

In Column 12, Line 53, in Claim 1, delete "b)—switching" and insert -- b) switching --, therefor.

In Column 12, Line 60, in Claim 1, delete "c)—using" and insert -- c) using --, therefor.

Signed and Sealed this

Thirteenth Day of January, 2009

JON W. DUDAS
*Director of the United States Patent and Trademark Office*